Oct. 11, 1960

B. C. SONNIER ET AL 2,955,458

TUBING TESTING DEVICE

Filed Oct. 15, 1956

INVENTORS
B. C. SONNIER
R. W. VERTREES
BY Jerry J. Dunlap
ATTORNEY

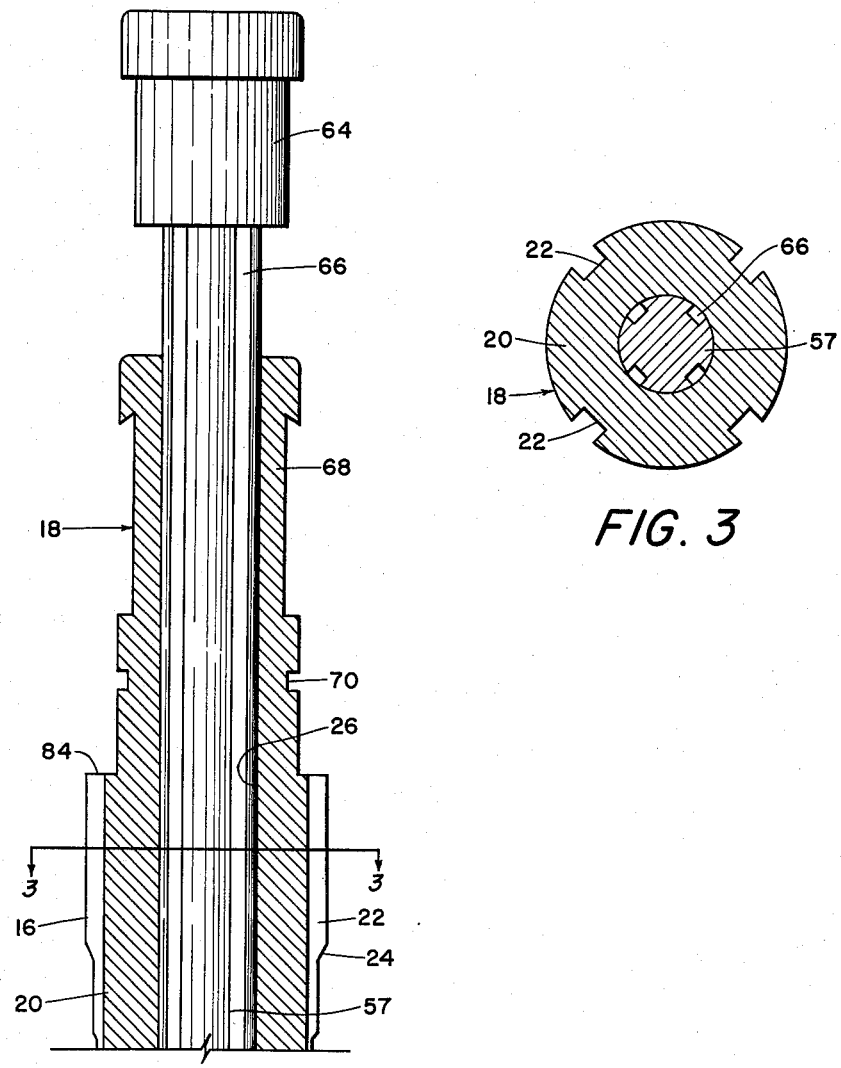

Oct. 11, 1960   B. C. SONNIER ET AL   2,955,458
TUBING TESTING DEVICE
Filed Oct. 15, 1956   3 Sheets-Sheet 3

INVENTORS
B. C. SONNIER
R. W. VERTREES
BY Jerry J. Dunlap
ATTORNEY

United States Patent Office 2,955,458
Patented Oct. 11, 1960

2,955,458
TUBING TESTING DEVICE

Bruce C. Sonnier, Ville Platte, La., and Ralph W. Vertrees, Kilgore, Tex., assignors to Continental Oil Company, Ponca City, Okla., a corporation of Delaware Filed Oct. 15, 1956, Ser. No. 615,787
2 Claims. (Cl. 73—40.5)

This invention relates generally to improvements in the art of pressure testing tubing, and more particularly to an improved device for use in pressure testing tubing accessible at only one end, which device may be easily removed after the test has been made.

In oil well servicing it is frequently necessary to test a vertical string of tubing for leaks, while the tubing is in the well bore, to determine whether the tubing will stand up under a predetermined pressure. For example, when an oil well is fractured, the fracturing fluid is usually pumped into the desired zone of the well through a string of tubing. As a result, the tubing will be subjected to an internal hydraulic pressure substantially equal to the pressure imposed on the well bore where the fracture occurs. If the tubing will not withstand the desired pressure, the fracturing fluid will leak out of the tubing above the zone where the fracture is to be made, and a sufficient pressure in the fracturing zone will not be attained. It is therefore highly desirable that the tubing be pressure tested prior to the fracturing operation and, following such a test, all substantial obstructions must be removed from the tubing to conduct the fracturing operation.

An important object of this invention is to provide a device for use in pressure testing a string of tubing, wherein the device may be easily removed from the tubing following a pressure test.

A further object of this invention is to provide a tubing testing device which, after removal, leaves no substantial obstruction in the string of tubing.

Another object of this invention is to provide a tubing testing device which may be removed without removing the tubing from a well bore.

A still further object of this invention is to provide a simply constructed tubing testing device which may be economically manufactured.

Other objects and advantages of this invention will be evident from the following detailed description, when read in conjunction with the accompanying drawings, which illustrate this invention.

In the drawings:

Figure 2 is a vertical sectional view through the upper portion of the testing device of this invention.

Figure 3 is a sectional view taken along lines 3—3 of Figure 2.

Broadly stated, the present invention may be defined as a device for pressure testing a vertical string of tubing, comprising, in combination, an annular seat in the tubing, a housing of a size to be moved through the tubing and engage said seat and having a longitudinal bore therethrough, and a removable valve separate from the housing of a size to seat in said bore.

Figure 1:
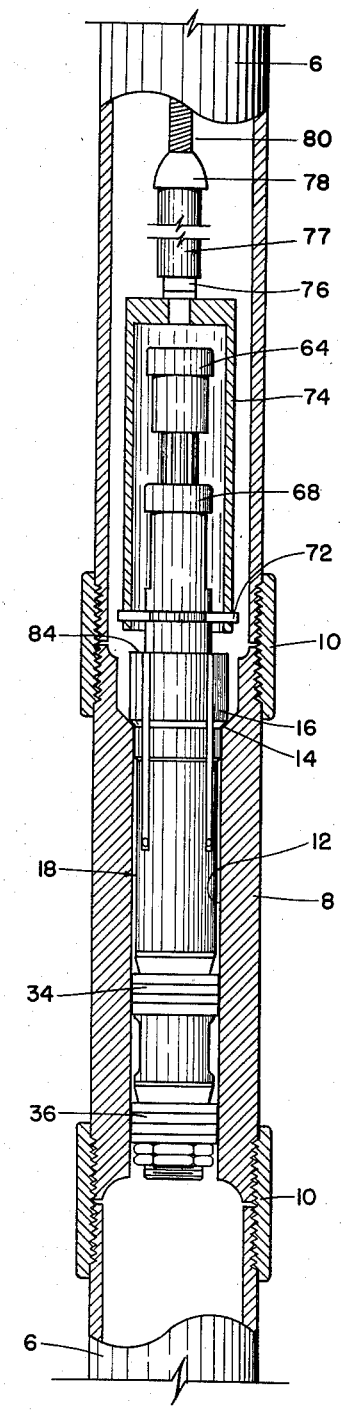
Figure 1 is a vertical sectional view through a portion of a string of tubing, partially in section, illustrating the installation of our novel tubing testing device in the tubing.

Referring to the drawings in detail, and particularly Figure 1, reference character 6 designates a typical string of tubing which may be suspended in a well bore (not shown). The tubing 6 will ordinarily be used in the production of the well and only intermittently used for various other operations, such as fracturing. Also, it is sometimes necessary to lower pressure bombs, samplers, etc., in a well containing a string of tubing and, in such cases, it is highly desirable to lower such tools through the tubing string 6, rather than remove the tubing from the well. Therefore, no permanent obstruction should be interposed in the tubing string which would prevent the passage of such tools therethrough.

In accordance with this invention, a tubular seating member 8 is either interposed in the tubing string 6 by means of couplings 10, or secured to the lower end of the tubing 6 in tandem relation with the tubing, depending upon the height desired for the seating member. The diameter of the inner bore 12 of the seating member 8 is slightly smaller than the inner diameter of the remainder of the tubing string 6, for the purposes which will be hereinafter set forth. However, the diameter of the bore 12 should be sufficiently large that various types of tools which are ordinarily passed through the tubing string 6 may also pass through the seating member 8. In normal operation of the well, the seating member 8 may serve as a seat for a standing valve (not shown) used in connection with a sucker rod type pump (not shown), as it is well known in the art.

The reduced diameter of the bore 12 of the member 8 provides an upwardly facing shoulder 14 which receives a flange 16 of the tubing testing device 18 of this invention.

Figure 2A:
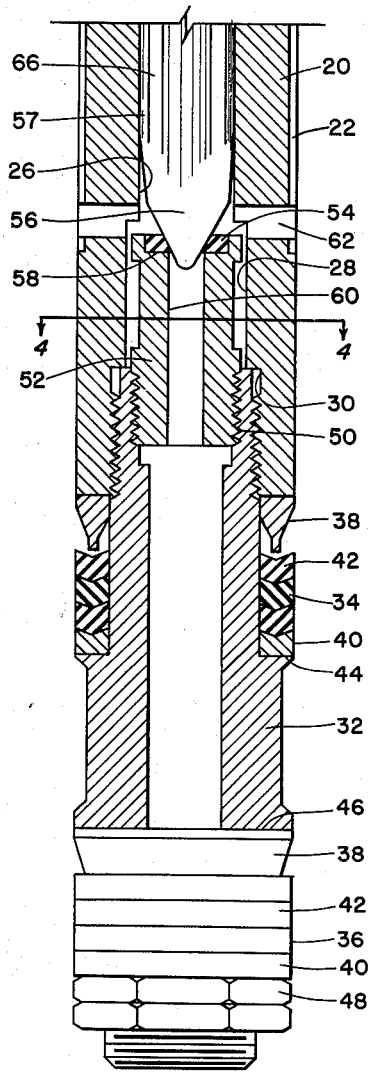
Figure 2A is a vertical sectional view through the lower portion of the testing device, and is a continuation of Figure 2.
Figure 4:
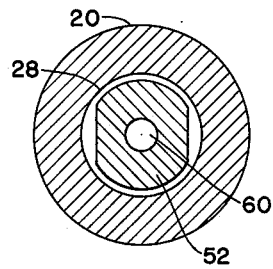
Figure 4 is another sectional view taken along lines 4—4 of Figure 2A.

The device 18 (see Figs. 2 to 4) comprises a tubular housing 20 having the flange 16 formed substantially around the central portion thereof. The housing 20, including the flange 16, must be of a size to pass through the tubing string 6 during movement of the device 18 to and from the seating member 8, as will be more fully hereinafter set forth. A plurality of grooves 22 (Figure 3) are formed through the flange 16 and downwardly along the body 20 in a direction parallel to the longitudinal axis of the body 20 to provide a by-pass of fluid and fluid pressure through the flange 16. The lower, downwardly facing shoulder 24 of the flange 16 may be tapered, if desired, to provide a mating surface for the upwardly facing shoulder 14 of the seating member 8.

The inner bore 26, extending longitudinally through the housing 20, is provided with two concentric counterbores 28 and 30 (Fig. 2A) at the lower end of the housing. The counterbore 30 is suitably threaded to receive the upper threaded end of a tubular packing mandrel 32 which extends downwardly from the housing 20. Two packing assemblies 34 and 36 are secured around the packing mandrel to provide a seal of the mandrel 32 in the reduced bore 12 of the seating member 8 when the device 18 is in its operating position as shown in Fig. 1. Each packing assembly preferably comprises a male packing adapter 38 and a female packing adapter 40 with a series of packing rings 42 interposed between the two adapters. In the upper packing assembly 34, the male adapter 38 may be secured to the lower end of the housing 20 and the female adapter 40 positioned on an upwardly facing shoulder 44 of the mandrel 32. It will then be apparent that when the mandrel 32 is threaded into the counterbore 30, the upper packing rings 42 will be retained between the respective adapters 38 and 40.

In the lower packer assembly 36, the male adapter 38 may be secured on a downwardly facing shoulder 46 of the mandrel 32, and the female adapter 40 may be supported on one or more jam nuts 48, with the nuts 48 being threaded onto the lower end of the mandrel 32. Therefore, when the nuts 48 are threaded onto the mandrel 32, the lower packing rings 42 will be pressed between the respective adapters 38 and 40 and retained in their operating positions to provide a seal with the seating member 8. When the packing rings 42 of both packer assemblies 34 and 36 are expanded into their operating positions, they should have a diameter slightly larger than the diameter of the housing 20 below the flange 16 to extend beyond the body 20 and sealingly engage the bore 12 of the seating member 8.

Internal threads 50 are formed in the upper end of the tubular mandrel 32 to receive the lower threaded end of a tubular insert 52. The insert 52 has a suitable annular valve seat 54 secured in the upper end thereof to receive the lower tapered or beveled end 56 of a secondary valve 57. The valve seat 54 is preferably formed out of a pliable, or gasket type material, and may be conveniently secured in a counterbore 58 formed in the upper end of the bore 60 of the insert 52. The diameter of the insert bore 60, and the inner diameter of the valve seat 54, may be of any desired size depending upon the pressure of fluid in the tubing string 6, as will be more fully hereinafter set forth. Also, it will be observed that a plurality of ports or passageways 62 are formed transversely through the walls of the housing 20 immediately above the inner valve seat 54 to provide communication between the inner bore 26 of the housing 20 and the lower end of the by-pass grooves 22.

The valve member 57 is preferably in the form of a cylindrical rod having a diameter of a size to provide a sliding fit of the valve in the bore 26. The valve 57 is also of a length to extend from the valve seat 54 to a point substantially above the upper end of the housing 20 as shown in Fig. 2. A standard wire line fishing neck 64 is formed on the upper end of the valve 57, and a plurality of circumferentially spaced by-pass grooves 66 are formed in the outer periphery of the valve 57 from the fishing neck 64 to the lower tapered end 56. The grooves 66 facilitate movement of the valve 57 in the bore 26, in that the grooves prevent accidental sealing of the valve 57 in the bore 26 by permitting a by-pass of fluid downwardly along the bore 26.

A tubular wire line fishing neck 68 is formed on the upper end of the body 20 and has an inner diameter corresponding to the diameter of the bore 26 to permit movement of the valve 57 therethrough. It will be observed that the fishing neck 68 is disposed below the fishing neck 64 when the valve 57 is seated on the valve seat 54.

We also provide a circumferential groove 70 around the housing 20 between the fishing neck 68 and the flange 16. The groove 70 receives a plurality of shear pins 72 (see Fig. 1) secured in the lower end of a tubular running tool 74. The running tool 74 is of a size to extend down over the fishing necks 64 and 68 and has a threaded stud 76 on the upper end thereof to receive the lower end of a set of weight bars and jars partially shown at 77. The upper end of the weight bars and jars 77 are secured to the connector 78 of a cable or rope 80.

Operation

When it is desired to pressure test the tubing string 6, as when contemplating a fracturing operation wherein the fracturing fluid is pumped down through the tubing, the valve 57 is telescoped into the bore 26 and seated on the valve seat 54. The running tool 74 is then telescoped over the fishing necks 64 and 68 and the shear pins 72 are inserted into the groove 70 in the manner shown in Fig. 1. The running tool 74, having the device 18 attached thereto, is then lowered through the tubing string 6 by means of the cable 80. The shear pins 72 will have sufficient strength to support the device 18.

When the device 18 reaches the seating member 8, the lower packing assembly 36 will engage the upper portion of the bore 12 to inhibit further downward movement of the device 18 by the force of gravity alone. The cable 80 is then raised a short distance and suddenly released to operate the weight bars and jars 77 and transmit an impact to the running tool 74, as it is well known in the art. When the additional weight or impact is imposed on the running tool 74, the running tool will be forced downwardly, breaking the shear pins 72 and transmitting the downward force onto the upper end 84 of the flange 16. The resulting downward force imposed on the device 18 will force the device on downwardly to position both packer assemblies 34 and 36 within the reduced bore 12 of the seating member 8. The device 18 will come to rest when the lower face 24 of the flange 16 contacts the shoulder 14 of the seating member 8. The running tool may then be removed by raising the cable 80. Since the shear pins 72 will have been broken, the running tool 74 will move freely up over the fishing necks 64 and 68 to prevent accidental dislodgement of the device 18.

In some operations, it may be convenient to seat the device 18 in the seating member 8 at the surface before running the tubing 6 in the well. In such cases, the use of the running tool 74 will, of course, not be required.

Any desired testing fluid is then pumped into the tubing 6 at the mouth of the well and the fluid will flow downwardly to the device 18. The packing assemblies 34 and 36 will prevent a downward flow of the testing fluid through the bore 12 of the seating member 8 around the housing 20, and the inner valve 57 (in conjunction with the valve seat 54) will prevent a downward flow of the testing fluid through the housing 20. Also, of course, the flange 16, being in contact with the shoulder 14 will prevent further downward movement of the entire device 18. Therefore, the pressure of the testing fluid may be raised to any reasonable value, and substantially none of the fluid will leak down past the seating member 8.

At the conclusion of the pressure test, the pressure at the upper end of the tubing string 6 is relieved, thereby reducing the pressure imposed on the device 18 to a value corresponding to the hydrostatic pressure of the testing fluid remaining in the tubing 6. A wire line fishing tool (not shown) is then lowered through the tubing 6 into engagement with the upper fishing neck 64. Whereupon, the valve 57 may be raised from the valve seat 54 through the bore 26 of the housing 20.

The force required to raise the valve 57 will be equal to the hydrostatic pressure of the fluid standing in the tubing 6 times the cross-sectional area of the inner diameter of the valve seat 54 at the upper end of the valve seat. It will thus be apparent that the diameter of the valve seat 54 will control the force required to raise the valve 57, and this diameter may be varied as desired by using different sizes of valve seats 54 and inserts 52, to retain the force required within the safe operating range of the wire line equipment used in raising the valve 57.

As the lower tapered end 56 of the valve 57 is removed from the valve seat 54, the testing fluid standing in the tubing 6 will start draining downwardly through the grooves 22, ports 62, bore 60 of insert 52 and then through the tubular packing mandrel 32 into the lower portion of the tubing string 6, or into the lower portion of the well, in the event the seating member 8 is secured on the lower end of the tubing string 6. As previously noted, the grooves 66 in the outer surface of the valve 57 will facilitate an easy removal of the valve 57, as soon as the lower end 56 is unseated from the seat 54. When the valve 57 is completely removed from the housing 20, the testing fluid standing in the tubing string 6 can drain directly down through the bore 26, insert 52 and packing mandrel 32. After a relatively short period of time, the pressure above and below the device 18 will be substantially equalized to permit easy removal of the main housing 20. The valve 57 is preferably removed from the tubing string 6, and then the wire line fishing tools are again lowered into the tubing to engage the fishing neck 68 and raise the remainder of the device 18.

In summarizing the operation of the present invention, it will be observed that the seating member 8 performs the function of a valve seat permanently secured in or to the tubing string 6 since the packers 34 and 36 of housing 20 seal themselves against the bore of this member. The housing 20 similarly performs the function of a main valve which seats on and in the seating member 8 to prevent a flow of fluid downwardly through the member 8. The valve 57 in turn functions as a pilot or drain valve to provide a completion of the valving function of the housing 20 when in its lower position, and provide an equalization of pressure across the housing 20 when in an open position. Thus, the entire device 18 may be easily removed from the tubing 6 by first raising the inner valve 57 to equalize the pressure across the main valve or housing 20, and then the remainder of the device 18 may be easily removed from the tubing without having to overcome the hydrostatic pressure of a column of testing fluid in the tubing string 6.

From the foregoing it will be apparent that the present invention provides a novel device for pressure testing a string of tubing, which device may be easily removed from the tubing following a pressure test. The device of the present invention may be removed without having to remove the tubing from the well, and after removal of the device, no substantial obstructions remain in the tubing. It will also be apparent that the device may be economically manufactured.

Changes may be made in the combination and arrangement of parts or elements as shown in the drawings and described in the specification without departing from the spirit and scope of the invention as set forth in the following claims.

We claim:

1. Apparatus for pressure testing a vertical string of tubing comprising: a tubular seating member for connection in tandem with the tubing, said member having an inner diameter slightly smaller than the inner diameter of the tubing and having an upwardly-facing circumferential shoulder; a tubular housing for insertion in said seating member and having an enlarged flange portion in the central portion thereof forming a downwardly-facing circumferential shoulder on the outer surface thereof to engage said upwardly-facing shoulder, said housing also having an upwardly-facing annular valve seat disposed therein at a point below said downwardly-facing shoulder, a plurality of transverse passageways located immediately above said valve seat providing communication between the outer portion and the inner bore of said housing, and a plurality of longitudinal-extending grooves in the outer surface thereof extending from the upper end of said flange to said passageways and providing communication therebetween; packing means on the lower portion of said tubular housing of a size to sealingly engage the inner periphery of said seating member; an elongated cylindrical rod of a size to fit slidingly in the bore of said housing, said rod being of a diameter greater than the inner diameter of said upwardly-facing valve seat and having the lower end portion thereof tapered to sealingly engage said upwardly-facing valve seat; and means on said housing and said rod engageable by wire line equipment for removal from the tubing.

2. The apparatus of claim 1 characterized further in that said rod is provided with a plurality of longitudinally-extending grooves in the outer surface thereof extending from the upper portion to the tapered end thereof.

References Cited in the file of this patent

UNITED STATES PATENTS

| | | |
|---|---|---|
| 1,955,113 | Davenport | Apr. 17, 1934 |
| 2,589,606 | Dunn | Mar. 18, 1952 |
| 2,737,245 | Knox | Mar. 6, 1956 |
| 2,742,093 | Vaughn | Apr. 17, 1956 |
| 2,776,015 | Bielstein | Jan. 1, 1957 |